United States Patent [19]
Brennan et al.

[11] Patent Number: 6,148,063
[45] Date of Patent: Nov. 14, 2000

[54] SEMI-INTERRUPTIBLE MESSAGES FOR TELEPHONE SYSTEMS MAKING VOICE ANNOUNCEMENTS

[75] Inventors: Paul Michael Brennan, East York; Anne Grosman, Willowdale; Robert Alan Williamson, Aurora, all of Canada

[73] Assignee: Nortel Networks Corporation, Montreal, Canada

[21] Appl. No.: 08/759,094

[22] Filed: Nov. 29, 1996

[51] Int. Cl.[7] .................................................... H04M 1/64
[52] U.S. Cl. .............................. 379/72; 379/67.1; 379/68; 379/76; 379/88.04
[58] Field of Search .................................. 379/67, 88, 89, 379/88.04, 88.08, 88.18, 88.26, 72, 76

[56] References Cited

U.S. PATENT DOCUMENTS

| | | |
|---|---|---|
| 4,035,589 | 7/1977 | Parke ............................................ 369/1 |
| 4,070,698 | 1/1978 | Curtis et al. ................................ 360/12 |
| 4,121,287 | 10/1978 | Leal et al. ................................. 364/461 |
| 4,757,525 | 7/1988 | Matthews et al. .......................... 379/89 |
| 4,958,366 | 9/1990 | Hashimoto .................................. 379/74 |
| 5,027,384 | 6/1991 | Morganstein ............................... 379/67 |
| 5,400,393 | 3/1995 | Knuth et al. ................................ 379/88 |
| 5,524,140 | 6/1996 | Klausner et al. ........................... 379/67 |

*Primary Examiner*—Fan S. Tsang
*Assistant Examiner*—Allan Hoosain
*Attorney, Agent, or Firm*—George MacGregor; Jeffrey M. Measures

[57] ABSTRACT

A call answering system or device for a telephone network provides a mechanism for an outbound message (typically a greeting in a call answering scenario) to be identified as semi-interruptible. An attempt to skip over a semi-interruptible message activates a warning message to alert the caller of the special status of the message. The caller may then choose to resume listening to the original message, or confirm their decision to skip it.

25 Claims, 2 Drawing Sheets

SEMI-INTERRUPTIBLE MESSAGES FOR TELEPHONE SYSTEMS MAKING VOICE ANNOUNCEMENTS

FIELD OF THE INVENTION

This invention relates generally to systems or devices which play voice announcements (messages) to persons over a telephone network, and in particular, to automatic call answering applications, systems, and devices, wherein a caller hears a message pre-recorded by the called party, and responds by recording their own message. Such systems may be controlled by DTMF signalling, proprietary signalling, or by voice command and a voice recognition mechanism.

BACKGROUND OF THE INVENTION

Automatic systems and devices which answer telephones and provide pre-recorded or automatically generated information to callers have become very common. Generally, these systems provide the caller with one or more informational messages, which the caller then bases some future action upon. Some systems also initiate the call, and it is the called party that is provided the pre-recorded or automatically generated information.

Typical examples of such systems are: voice menus, which provide callers with a set of choices, from which the caller then selects the most appropriate choice; and automatic call answering, which plays a pre-recorded message from the called party, and then allows the calling party to record a message.

All of the above systems are well known. Northern Telecom manufacturers a number of systems which will answer an inbound call, provide the caller with outbound messages, and then allow the caller to take further action (e.g. Meridian IVR, Flashtalk automated attendant for Norstar, and Meridian Mail's automated attendant and voice services); most of these systems also are capable of initiating calls and providing the called party with information. Northern Telecom also manufactures a variety of systems and devices to provide call answering, ranging from those designed to answer a single private line (e.g. Nortel 9516 digital answering machine) to those designed for a key system (e.g. Flashtalk for Norstar) to those designed for a PBX or even a central office (e.g. Meridian Mail).

These systems generally allow callers to take actions while the outbound instructions or messages are being played, before they have been heard in their entirety by the calling party. This is an important function of such systems as it facilitates interaction with the system by frequent users, who, having heard the outbound message once, do not need or desire to hear it again.

However, a problem occurs when the calling party takes such an action prior to the completion of the playing of the outbound message, when the outbound message has changed since the caller last heard it such that the calling party would, if they heard the message in its entirety, take a different action. In general, this results in the calling party missing valuable information, or taking inappropriate action, or missing the opportunity to take an action that would save them time and or money.

Within the domain of call answering systems or devices, this problem can result in callers missing an important part of the greeting and leaving a message anyway. For example, they may not hear that the called party is out of the office for the next 6 months, won't be retrieving messages until then, and that they should contact a third party instead. The impact of this missed greeting varies with the call, but in some business environments such miscommunications may lead to significant expenses or lost revenues.

This problem is typically addressed, if at all, in one of the following ways: the outbound message is made uninterruptible, forcing all callers to hear it in its entirety; the outbound message is prefixed with an uninterruptible warning that the message has changed; or the outbound message is prefixed with an interruptible warning that the message has changed.

Each of these typical solutions to this problem cause other problems.

When the outbound message is completely uninterruptible, repeat callers are forced to spend their time and possibly toll charges, and the system itself forced to spend its resources, playing a message which has already been heard.

When an uninterruptible prefix is added to a message, first-time callers are forced to spend their time and possibly additional toll charges listening to a warning prefix that they don't even need, and repeat callers are still forced to waste time and possibly money on listening to the warning they have already heard, and the system itself must waste resource playing the warning to both types of callers.

When an interruptible prefix is added to a message, first-time callers are forced to spend their time and possibly additional toll charges listening to a warning prefix that they don't even need, and the system must spend its resources playing it, and repeat callers may miss the warning completely in their haste to skip on to the response.

SUMMARY OF THE INVENTION

The object of the present invention is to improve on the existing art, by allowing the user (called or calling party) to interrupt playback of an outgoing message to bypass it, but with a post-interruption warning to users that they have skipped a special or changed message, and a mechanism whereby the user can then choose to return to listening to the message, or now fully knowing the special or changed status of the message, confirm their decision to bypass it. We describe this feature as a "semi-interruptible message".

Within a typical call answering application, it would work as follows:

a) caller is routed to call answering system or device;

b) caller starts to hear outgoing message (greeting) of called party;

c) caller activates function to skip over message;

d) caller hears warning that special greeting is in place e) caller then may choose to resume or restart playback of greeting, or, if the caller is for whatever reason not concerned about the special greeting (e.g., they have already heard it, or their message is of no urgency), they can confirm their desire to skip over the special greeting and proceed to recording their message.

f) the feature has no impact on the current art of call answering mechanisms UNLESS the caller attempts to activate the function to skip over the message.

Note that the user's choice to resume playback of an interrupted message may result in a resumption of playback of the message at the point of interruption, or a restart of playback of the interrupted message from its beginning. The appropriate point of resumption depends on the specific application and, possibly, the actual or expected length of the outgoing message. In some cases, it may even be appropriate to offer the user the choice of resuming or restarting playback of the interrupted message.

The advantages of this mechanism are as follows: users who don't try to skip or interrupt the message are not impacted at all, saving both user's time and system resources; users who do try to skip or interrupt the message are then and only then warned that they may have missed something important, and are then given a chance to ignore the warning (and indeed, skip it if they have heard it before), or resume playback of the original message. In summary, this invention reduces the likelihood of users missing information, yet with little or no wastage of user time or system resources.

In a further aspect of the invention the semi-interruptible nature of a message is provided with an automatic, time-dependent cancellation feature. This allows for "new", semi-interruptible messages to automatically change status to a typical interruptible message as the information becomes dated and it is expected that all likely callers have by that time heard the information.

In a further aspect of the invention a semi-interruptible message is provided with an automatic, time-dependent cancellation feature, which replaces the semi-interruptible message with another message. This allows for a message having a limited lifespan to automatically be replaced with a different message. In the call answering application, this would allow automatic replacement of a greeting indicating an absence with the "normal" greeting at the date or time when that absence is scheduled to end.

In a further aspect of the invention the semi-interruptible message mechanism is modified to permit some interruptions to occur without any warning; for example, when an attempted action would be deemed to be independent of the contents of the message being interrupted.

BRIEF DESCRIPTION OF THE DRAWINGS

The invention will now be described in greater detail. The attached drawings provide a visual description of the flow of the interaction between caller and system or device making use of this invention.

DETAILED DESCRIPTION OF THE INVENTION

Figure 1:
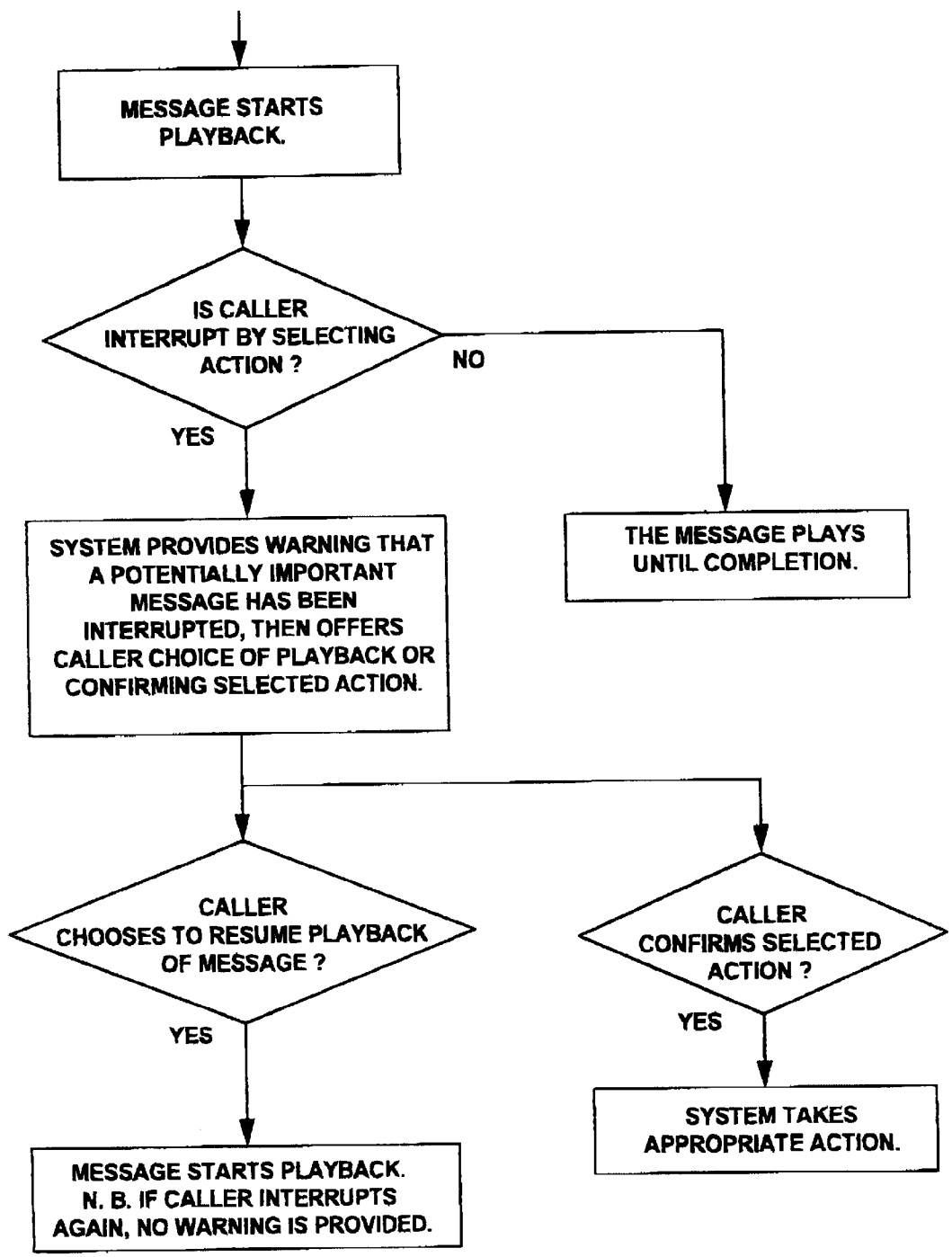
FIG. 1 is a flow diagram of the interaction between system/device and the caller during the playing of a "semi-interruptible message" of a general nature.
Figure 2:
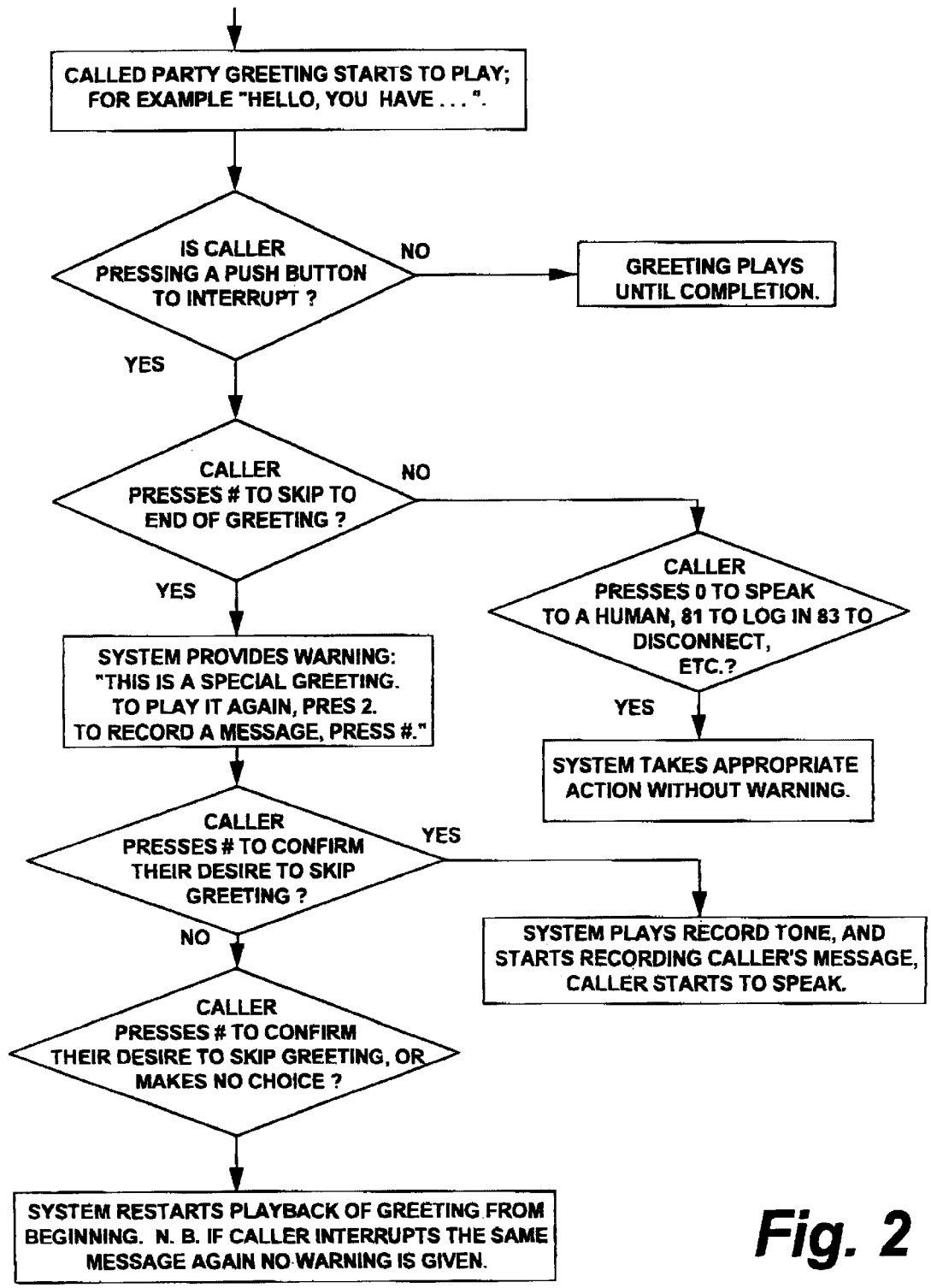
FIG. 2 is a flow diagram of the interaction between system/device and the caller specifically during a typical call answering session in Meridian Mail's embodiment of the invention.

This feature is applicable to any system or device which:

a) provides over a telephone network a person with a recorded message (greeting) that may or may not be of special importance; and/or b) wishes to provide the person with a mechanism for skipping that message, yet providing that person some warning that the message may be of special importance The following description describes the implementation of this feature in Northern Telecom's Meridian Mail voice messaging system. It should be obvious to anyone skilled in the art how other applications making use of voice announcements could incorporate the "semi-interruptible" message feature.

To activate a "semi-interruptible" greeting, the mailbox owner logs in to their mailbox as they do today (Meridian Mail is not significantly different from other products in this aspect). They then enter the command to change greetings (8-2), and then select the "Temporary" greeting (3). They then record the "Temporary" greeting, and may choose to play it back for verification, or re-record it if desired.

Once recorded, the subscriber can, at their option, immediately or at any time when in the temporary greeting is in force, request an automatic deletion/expiry for the "temporary" greeting (9). They can enter a date and time for that deletion/expiry by way of a DTMF signal input via the key pad, for example.

Upon exiting from the "Temporary" greeting (through selection of another function or by disconnecting), the "Temporary" greeting is put into place and is heard by callers until it is deleted automatically by the system on the pre-determined date or manually by the subscriber when appropriate.

The "Temporary" greeting is disabled only via its deletion, under the assumption that each temporary greeting would be recorded for and useful for only the unique occasion which it represents.

Once the "Temporary" greeting is deleted, either manually or automatically, callers to the mailbox subscriber would hear the standard greeting for the mailbox. Within the Meridian Mail product, standard greetings can be specified for both internal and external callers; both of the standard greetings are replaced by the "Temporary" greeting when it exists.

To further reduce the impact of the semi-interruptible interaction on system resources and callers, and to facilitate the subscriber remembering when they have a temporary greeting in place, they receive an audible reminder or prompt each time they log into the mailbox when they have a temporary greeting in force. If the temporary greeting has been configured to automatically be deleted, the reminder is omitted.

Callers to the system will only notice that it is a Temporary greeting if they attempt to bypass it, by, for example, activating the skip forward function in the key pad (other bypassing functions are the recording function and the stop playback of greeting function). The call answering service then plays a prompt to the user that "This is a special greeting. To play it again, press 2. To record a message now, press #.". If the calling party elects to replay the message, any subsequent attempts to interrupt will not generate warnings. This action is based on the assumption that, having been given the warning once, there is no need to repeat it.

Meridian Mail also allows the caller to enter certain commands without any special status announcement or interruption. These commands include those which do not lead to eventual message recording. Examples of these are: login to the caller's own mailbox; through-dial to another individual; or, in fact, any other case in which the caller demonstrates no intention of recording a voice message. This action is based on the assumption that a caller not intending to leave a message in the mailbox they have reached need not hear about any special status of that mailbox.

Meridian Mail assigns the confirmation commands to the same keys that the original prompt interruption commands were. This allows the user to merely repeat the depression of the key, facilitating the interaction for the user who knows that they want to skip the message.

While certain specific embodiments of the invention have been illustrated and described it will be apparent to one skilled in the art that numerous alternatives or variations can be made to the basic inventive concept. It is to be understood that any such changes will fall within the scope of the invention as defined by the appended claims.

We claim:

1. In a telephone-based system having announcement means to provide a user with audible information messages, means for defining a status of an audible information message as being semi-interruptible, warning means, responsive to an attempt by said user to bypass an outbound message with a status having been defined as semi-interruptible, to advise said user that said outbound message has a semi-interruptible status.

2. A telephone-based system as defined in claim 1 wherein said warning means advises said user of the semi-interruptible status of said outbound message by a pre-recorded audible message.

3. A telephone-based system as defined in claim 2 wherein said pre-recorded audible message provides said user with options respecting the handling of the outbound message.

4. A telephone-based system as defined in claim 3, wherein one of said options is to allow said user to immediately record an inbound message.

5. A telephone-based system as defined in claim 3, wherein one of said options is to allow said user to return to the beginning of said outbound message.

6. A telephone-based system as defined in claim 3, wherein one of said options is to allow said user to continue with the outbound message from the point of interruption.

7. A telephone based system as defined in claim 2, having adjustable time setting means whereby the audible pre-recorded message is deleted from the system at a predetermined time.

8. A telephone-base system as defined in claim 7 wherein the pre-recorded message is replaced with a second pre-recorded message at a predetermined time.

9. In a telephone device having recording means and announcement means for providing a caller to said device with an audible pre-recorded information message, means for defining a status of an audible information message as being semi-interruptible, a warning means, which is responsive to an attempt by said caller to bypass as outbound message with a status having been defined as semi-interruptible, to provide said caller with an announcement that the outbound message has a semi-interruptible status.

10. A telephone device as defined in claim 9, said announcement providing said caller with options as to the further processing of said outbound message.

11. A telephone device as defined in claim 10, one of said options being to allow said caller to immediately begin recording an inbound message.

12. A telephone device as defined in claim 10, one of said options being to allow said caller to replay said outbound message from the beginning.

13. A telephone device as defined in claim 10, one of said options being to allow said caller to continue with said outbound message from the point of interruption.

14. A telephone device as defined in claim 9 having adjustable date and time setting means whereby the announcement is deleted from the device at a predetermined time.

15. A telephone device as defined in claim 14, wherein said announcement is replaced with another message at a predetermined time.

16. In a telephone-based system having means to record an inbound message and means to provide an outbound message, a method of operate the telephone-based system comprising the steps of:

defining a status of an outbound message as being semi-interruptible, detecting that an incoming call has been intercepted by the means to provide an outbound message;

in response to the outbound message being of the semi-interruptible status monitoring the progression of the outbound message for an attempt by the calling party to interrupt the outbound message;

on detection of an attempt to interrupt, providing a warning message informing the calling party that the outbound message has a semi-interruptible status; and including with the warning message information as to options for controlling the progression of the outbound message.

17. The method as defined in claim 16, wherein one of the options is to have the outbound message replayed from the beginning.

18. The method as defined in claim 16, wherein one of the options is to have the outbound message continue from the point of interruption.

19. The method as defined in claim 16, wherein one of the options is to allow the caller to proceed with recordal of an inbound message.

20. The method as defined in claim 16, including the step of attaching a time dependent cancellation algorithm to the warning message whereby the warning message is automatically cancelled at a predetermined time.

21. The method as defined in claim 20, wherein the warning message is replaced with a second message at a predetermined time.

22. In a telephone device having call interception means to cause said device to go off-hook after a pre-set number of rings; messaging means to deliver an outbound greeting to a calling party and; recording means to record an inbound message from said calling party, a method of operating the telephone device comprising the steps of;

identifying the greeting as being a message of a semi-interruptible status;

intercepting a telephone call after an occurrence of said pre-set number of rings;

providing the greeting from the messaging means to the calling party and in response to the semi-interruptible status of the greeting monitoring the progress of delivery of the greeting;

in response to an attempt by the calling party to interrupt the delivery of the greeting, providing the calling party with an audible warning that the greeting contains important information; and providing the calling party with a list of options which are available for controlling and terminating the progress of the greeting.

23. The method as defined in claim 22 wherein one of the available options is to replay the outbound greeting from the beginning.

24. The method as defined in claim 22 wherein one of the available options is to continue with the outbound greeting from the point of interruption.

25. The method as defined in claim 22 wherein one of the available options is to skip the outbound greeting and to begin recording an inbound message.

* * * * *